United States Patent [19]
Diegel

[11] 4,211,598
[45] Jul. 8, 1980

[54] FOIL APPLICATOR FOR FOLDING AND APPLYING ADHESIVE BACKED FOIL TO THE EDGE OF A WORK PIECE

[76] Inventor: Herbert F. Diegel, 1524 E. Culver, Phoenix, Ariz. 85006

[21] Appl. No.: 32,004

[22] Filed: Apr. 20, 1979

[51] Int. Cl.² .......................... B31F 1/00; B44C 7/00; B32B 31/00
[52] U.S. Cl. .................................. 156/468; 156/489; 156/574; 156/579
[58] Field of Search ............... 156/465, 468, 216, 489, 156/579, 574

[56] References Cited
U.S. PATENT DOCUMENTS

| | | | |
|---|---|---|---|
| 2,916,079 | 12/1959 | Schiefer | 156/216 |
| 3,038,982 | 6/1962 | Ludlow | 156/216 |

Primary Examiner—Douglas J. Drummond
Attorney, Agent, or Firm—Cahill, Sutton & Thomas

[57] ABSTRACT

A foil applicator is provided having a base incorporating a platform with a planar work surface. The platform includes an entrance and an exit end with the exit end terminating in a smoothly curved surface extending from the plane of the work surface to form a smoothly rounded surface at the platform exit. A pair of spaced apart work piece guide arms are attached at the entrance end of the platform to the base and are movable toward and away from each other. The guide arms are spring biased toward one another to urge the guide arms into gripping contact with a work piece positioned in the channel formed by the guide arms and planar work surface.

8 Claims, 10 Drawing Figures

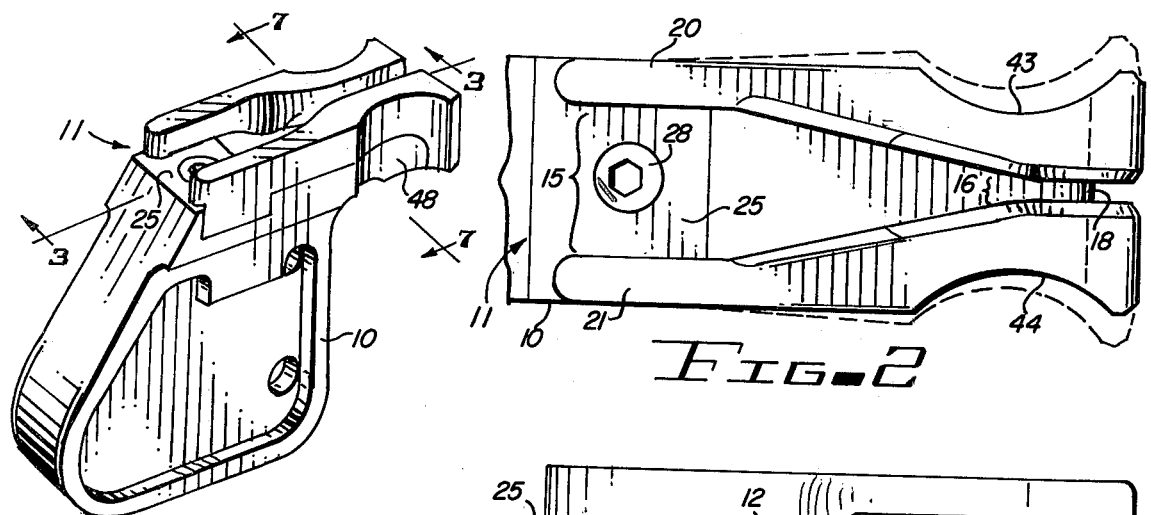
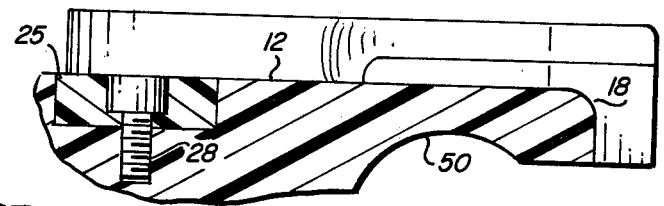
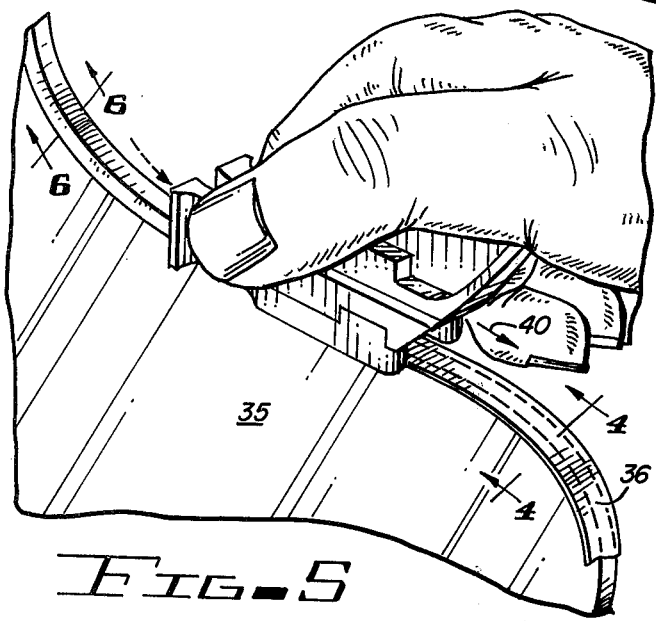
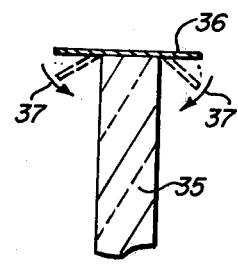
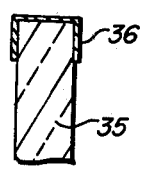
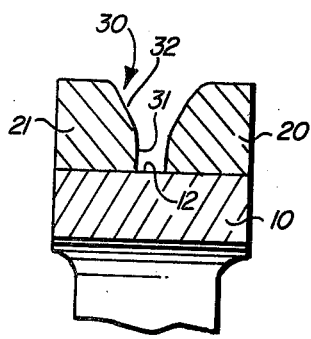

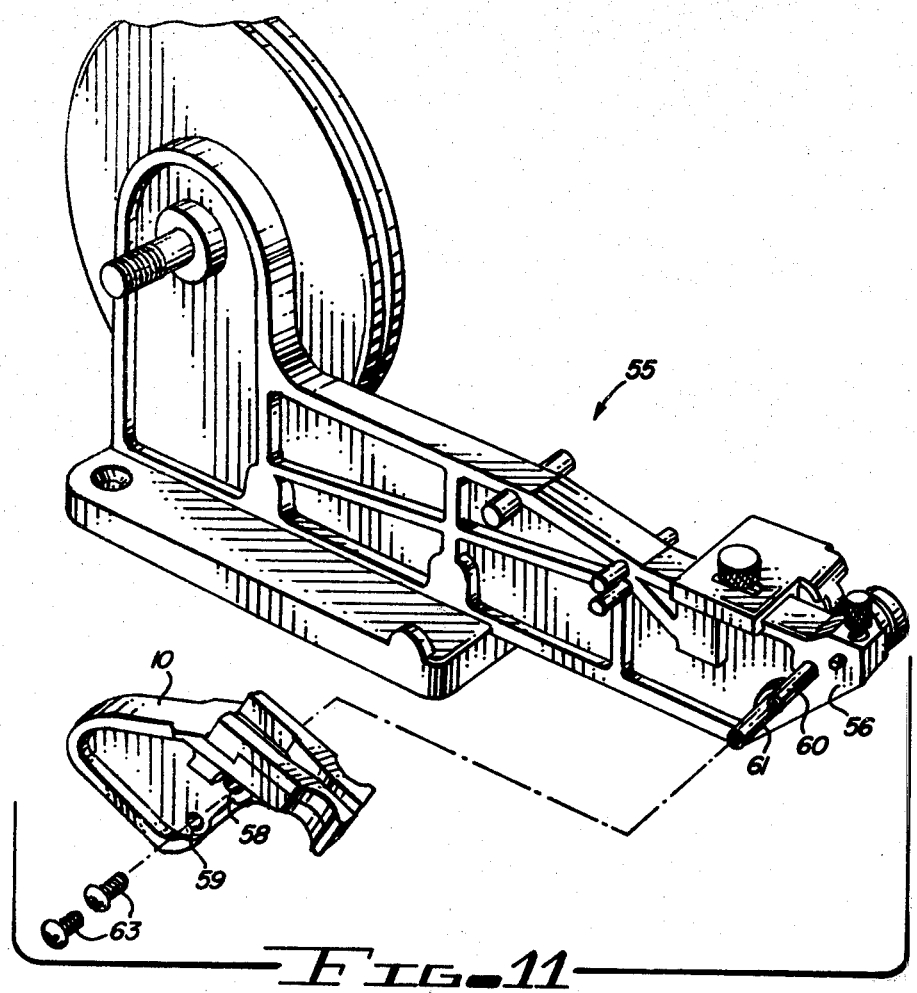
FIG-11
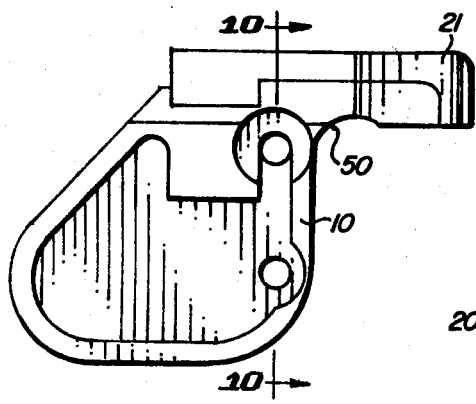
FIG-8
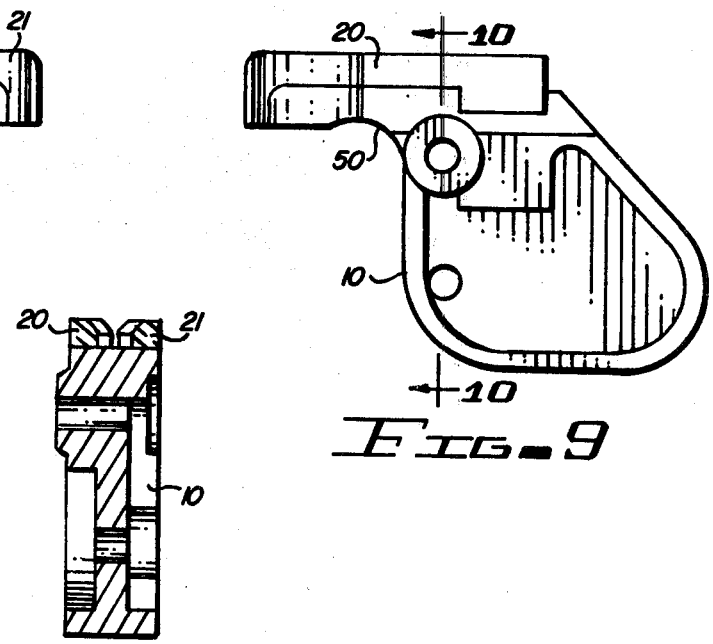
FIG-10
FIG-9

FOIL APPLICATOR FOR FOLDING AND APPLYING ADHESIVE BACKED FOIL TO THE EDGE OF A WORK PIECE

The present invention pertains to apparatus for urging the adhesive surface of an adhesively coated foil into intimate contact with the edge of a substantially flat work piece and into contact with the surfaces of the work piece adjacent the edge.

Modern stained glass works are constructed of numerous, sometimes several thousand, small pieces of colored glass or glass-like plastic which are cut to be joined along adjacent edges to form the desired design. Improvements in the technique for joining adjacent glass sections have facilitated the production of stained glass works without detracting from the appearance or aesthetic value of the finished work.

Typically, each individual glass piece is first "edged" with a copper foil and then butted against adjacent glass pieces to be permanently bounded thereto by a ribbon of lead-like solder formed over the adjacent surfaces of the abutting pieces. The copper used for edging the respective individual pieces of glass is originally provided in a continuous strip roll having a pressure-sensitive adhesive on one surface thereof with a protective peel-off covering in contact with the adhesive. The strip is unrolled and the protective covering is peeled back to expose the adhesive surface which is placed in contact with the edge of the piece. The foil is then secured entirely around the piece in contact with all exposed edges. The width of the foil strip is greater than the thickness of the piece or the width of the edge such that the portion of the foil that extends beyond the edge of the piece is folded down onto the flat surface of the piece to form a copper "frame" about the piece.

The foil, after being secured entirely around the work piece in contact with the edge, must then be folded down in a very careful manner to avoid discontinuities in the foil and to ensure complete and thorough contact along all edges of the work piece and particularly along the surfaces of the work piece adjacent the edge. Typically, prior art techniques for performing this last step, frequently referred to as "crimping", incorporate the simple use of a cylindrical dowel that the operator rubs against the foil covered edge to ensure intimate contact between the foil and edge. The portion of the foil that extends beyond the edge is then preliminarily folded over onto the adjoining surfaces by hand; subsequently, the operator again uses the cylindrical dowl to smooth the foil and to remove any air bubbles or discontinuities that may otherwise occur, particularly in that portion of the foil adjacent the edge of the work piece. Such prior art procedures are very cumbersome and time consuming; further, the procedure is very tiresome which can adversely affect the productivity of an operator through boredom and fatigue, and can sometimes cause injury from cuts caused by sharp edges.

It is therefore an object of the present invention to provide a foil applicator that rapidly and effectively urges the adhesive backing of a foil into intimate contact with the edge of a work piece and into contact with the surfaces of the work piece adjacent the edge.

It is another object of the present invention to provide a foil applicator that can apply proper pressure against a foil to ensure intimate adhesion between the foil and a work piece while insuring uniformity of the resulting foil-work piece contact.

It is still another object of the present invention to provide a foil applicator that can readily be manipulated by an operator's hand or, alternatively, can be mounted on a stationary support to be used by an operator through the manipulation of the work piece.

These and other objects of the present invention will become apparent to those skilled in the art as the description thereof proceeds.

Briefly, in accordance with the embodiment chosen for illustration, a foil applicator is provided with a base having a platform with a planar work surface. The planar work surface contacts the non-adhesive side of a foil and urges the adhesive side of that foil against the edge of the work piece. The planar work surface of the platform terminates in a smoothly curved surface that permits the applicator to be urged against the edge of a work piece even though the work piece may include a concave shape. A pair of guide arms are secured to the base and are spaced apart to form a guide channel with the planar work surface. The guide arms are attached at one end thereof to the base through the expediency of an integrally molded bridge which may be fastened to the base in any convenient manner. The guide arms are urged toward one another so that when the foil covered edge of a work piece is placed in contact with the planar work surface, the guide arms contact the foil overlapping the work piece edge and fold it into contact with the surfaces of the work piece adjacent the edge. The spring loading of the respective arms is provided by the normal resiliency of the material with which the arms are formed. The force of the spring urging causes the applicator to grip the work piece.

The present invention may more readily be described by reference to the accompanying drawings, in which:

FIG. 1 is a perspective view of an applicator constructed in accordance with the teachings of the present invention.

FIG. 2 is a top view, somewhat enlarged, of a portion of the apparatus of FIG. 1.

FIG. 3 is a cross-sectional view, somewhat enlarged, of a portion of the apparatus of FIG. 1 taken along lines 3—3.

FIG. 4 is a cross-sectional view of a portion of the work piece of FIG. 5 taken along lines 4—4.

FIG. 5 is a perspective view of a work piece and the apparatus of the present invention showing the relationship of the two as the apparatus is used for the application of foil to the work piece.

FIG. 6 is a cross-sectional view of a portion of the work piece of FIG. 5 taken along lines 6—6.

FIG. 7 is a cross-sectional view, somewhat enlarged, of a portion of the apparatus of FIG. 1 taken along lines 7—7.

FIG. 8 is a side elevational view of an apparatus constructed in accordance with the teachings of the present invention and intended for use on a stationary mount such as that shown in FIG. 11.

FIG. 9 is a side elevational view showing the opposite side of the apparatus of FIG. 8.

FIG. 10 is a cross-sectional view of the apparatus of FIG. 8 taken along lines 10—10.

FIG. 11 is a perspective view, partly exploded, of the apparatus of the present invention shown as it may be used in connection with apparatus for dispensing adhesive backed foil.

Referring now to the drawings, the apparatus of the present invention includes a body 10 having a platform 11 incorporating a planar work surface 12 for contacting a non-adhesive side of an adhesively backed foil and urging the adhesive side of the foil into contact with the edge of a work piece as will be described more fully hereinafter. The applicator is intended to be drawn along the edge of the work piece (or alternatively for the work piece to be drawn along the applicator) so as to contact the foil and urge the foil against the work piece. The platform 12 thus includes a foil entrance end 15 and a foil exit end 16. The platform 12 terminates at the foil exit end 16 in a smoothly curved surface 18 that curves downwardly from the planar surface 12 to provide a smoothly rounded corner at the platform exit edge. The purpose of this important feature will be described more fully hereinafter.

A pair of work piece guide arms 20 and 21 are molded integrally with a bridging member 25 which is secured to the base 10 by any convenient means such as attaching screw 28. The material with which the base 10 and the arms 20 and 21 are made is not critical. However, it has been found convenient to form them of readily available plastic materials. The arms 20 and 21, having been molded integrally with the bridging member 25, are thus secured to the base 10 only at the foil entrance end 15 of the platform 12. The arms are therefore movable to the extent they can be bent or forced apart such as shown in broken lines in FIG. 2. In the embodiment chosen for illustration, the resilience of the plastic material with which the arms are formed provides sufficient spring biasing force to urge the arms toward one another when they are separated by the placement of a work piece therebetween.

The arms 20 and 21, together with the planar work surface 12, form a guide channel whose width tapers from the foil entrance end 15 to the foil exit end 16. The cross-sectional shape of the channel may best be seen by reference to FIG. 7. Each of the guide arms 20 and 21 include a guide and foil folding surface 30 facing the guide channel with the lower portion of the guide surface 31 extending perpendicularly from the planar work surface 12 for a predetermined distance and then curving away from the channel as shown at 32. The cross-section of the channel formed by the planar work surface 12 and guide arms 20 and 21 therefore has a rectangular cross-section at the bottom of the channel and flares outwardly toward the top. The width of the channel, as stated previously, tapers from the foil entrance end to the foil exit end of the platform when the work piece is inserted into the channel, the guide arms 20 and 21 will be forced apart as indicated in broken lines in FIG. 2 and the planar work surface 12 will come into contact with the foil to urge it against the edge of the work piece. The perpendicularity of the portion of the guide arm surface, such as shown at 31, is important since if the surface of the guide arms were tapered in an area close to the work surface 12, the spring force of the arms would not only force the arms against the work piece but would also wedge the work piece out of contact with the work surface 12.

The operation of the apparatus of the present invention may now be described with particular reference to FIGS. 4, 5 and 6. A work piece 35, such as a flat piece of stained glass, has been provided with an adhesively coated foil, such as a copper foil 36, along one edge. The initial application of the adhesively backed foil to the edge of the work piece may be accomplished in any convenient manner such as, for example, using a method and apparatus described and claimed in copending patent application, Ser. No. 902,298 filed May 3, 1978 and entitled "METHOD AND APPARATUS FOR DISPENSING ADHESIVE-BACKED FOIL". In that patent application, a foil dispenser is described for automatically unreeling a foil from a roll, removing a protective covering on an adhesive coating, and applying the flat foil to the edge of a work piece such as that shown in FIG. 4. Alternatively, the foil may be applied by hand to the edge of the work piece. The apparatus of the present invention is then used to fold over the edges of the foil into intimate contact with the surfaces of the work piece adjacent the work piece edge. That is, the foil 36 is folded over, as indicated by the arrows 37 in FIG. 4, to a position such as that shown in FIG. 6. Normally, the operator will initially slightly bend the edges of the foil by hand. The present apparatus is then placed on the foil covered edge of the work piece, as shown in FIG. 5, and drawn along the edge, as indicated by the arrow 40, to completely flatten the tape against the work piece to ensure intimate adhesion and contact both along the edge of the work piece as well as along the adjacent work piece surfaces.

As the apparatus is drawn along the edge, the edge of the work piece 35, with the foil 36 thereon, comes into contact with the planar work surface 12. As the applicator is drawn along the edge, the guide arms 20 and 21 come into contact with that portion of the foil lying against the surfaces of the work piece adjacent the work piece edge. The spring urging of the respective arms forces the foil into firm contact with the work piece surface. If the edge of the work piece is concave, it is important to have the planar work surface 12 terminate in a smoothly rounded corner 18 so that the applicator can be drawn along the work piece edge into the concave area with the point of contact between the work piece and the applicator varying along the work surface 12 and the smoothly rounded corner 18. It may be noted that the guide arms 20 and 21 extend along the work surface 12 and are movable toward and away from each other basically parallel to the plane of the work surface 12. It may also be noted that arms 20 and 21 extend along the work surface 12 and continue adjacent, and closely follow, the curved surface forming the rounded corner 18. In this manner, the guide arms 20 and 21 are continuously urged against the sides of the work piece even when the applicator is being used on a work piece having a concave edge.

The spring biasing on the guide arms 20 and 21 may be provided by other than the inherent resilience of the material with which the arms are formed. Further, concave notches 43 and 44 are provided in the arms 20 and 21, respectively, to receive an operator's fingers for urging the arms toward each other and into firm contact with the work piece positioned between the arms. Thus, if the operator chooses not to rely solely on the force provided by the spring biasing means acting upon the arms 20 and 21, he may augment or supplement the force by applying squeezing pressure between the arms 20 and 21 at the notches 43 and 44 provided for his fingers. To ensure that the base 10 does not interfere with the operator's fingers as such pressure is applied, corresponding notches, such as that shown at 48, are provided in the base 10 and are aligned with the notches in the arms 20 and 21. In the operation of the apparatus described thus far, it is assumed that the applicator is to be held in the operator's hand. Under some circumstances, it may facilitate the operartor's manipulation of the applicator by providing a finger or thumb notch, such as that shown at 50; the notch 50 combined with the general pistol-grip shape of the body 10, render the applicator easily manipulated in an operator's hands. The form of the apparatus shown in FIGS. 8–11 is somewhat modified to accommodate its mounting on a tape dispenser, such as that shown at 55. The dispenser 55 is similar to that described in the above identified patent application. In many instances, it may be found more convenient to secure the body 10 to the frame 56 of the apparatus 55 so that the operator can use the applicator immediately after the placement of tape on the edges of the work piece through the utilization of the dispenser 55. To provide such convenient mounting and placement of the present applicator, holes 58 and 59 are provided to accept mounting shafts 60 and 61, respectively. The shafts are internally threaded to accept screws 63 to thereby securely fasten the applicator to the frame 56.

When the applicator of the present invention is secured in a manner such as that shown in FIG. 11, the operation of the device is substantially the same with the exception that the operator does not now manipulate the applicator in his hand, but rather manipulates the work piece as the edge thereof is passed through the channel formed by the guide arms 20 and 21 and the work surface 12.

The specific outside shape of the guide arms is not critical; further, the particular manner of attaching the arms to the base 10 may vary considerably. For example, the arms may individually be attached to the base rather through the utilization of a bridge member. Further, the bridge member may be secured to the base by means other than the screw, as shown. Other modifications can be made in the size, shape and materials without departing from the concept of the present invention.

I claim:

1. A foil applicator, for folding and applying adhesive-backed foil to the edge of a substantially flat work piece, and to the flat surfaces of the work piece adjacent the edge, comprising:
   a. a base having a platform with a planar work surface for contacting a non-adhesive side of said foil and urging the adhesive side of said foil against the edge of said work piece;
   b. said platform having a foil entrance end and a foil exit end, said foil exit end terminating in a smoothly curved surface extending from the plane of said platform to form a smoothly rounded corner at the platform exit edge;
   c. a pair of spaced apart work piece guide arms;
   d. attaching means for attaching said arms to said base adjacent said planar work surface;
   e. said guide arms and said planar work surface forming a guide channel to receive and guide the work piece edge relative to said applicator, said guide arms extending along said planar work surface from said foil entrance end to said foil exit end and continuing adjacent said smoothly curved surface at the foil exit end, said channel tapering from said foil entrance end to said foil exit end;
   f. said guide arms movable toward and away from each other; and
   g. biasing means urging said guide arms toward each other so as to grip a work piece positioned in said channel and force said foil into contact with the surfaces of said work piece adjacent the work piece edge.

2. The apparatus of claim 1 wherein each of said guide arms includes a guide surface facing said guide channel, said guide surface extending perpendicularly from said planar work surface for a predetermined distance and then curving away from said channel to form a channel having a rectangular cross section at its bottom and flaring outwardly toward its top.

3. The apparatus of claim 1 wherein each of said guide arms is attached to said base only at said foil entrance end and is bendable in a plane parallel to said planar work surface to move toward and away from each other.

4. The apparatus of claim 1 wherein said base includes a pair of externally positioned oppositely disposed concave notches adjacent said foil exit end, and wherein each of said guide arms includes a concave notch aligned with one of the notches in said base to receive an operator's fingers for urging said arms toward each other.

5. The apparatus of claim 1 wherein said guide arms are molded integrally with each other and with a bridging member, said bridging member secured to said base and forming said attaching means.

6. The apparatus of claim 2 wherein each of said guide arms is attached to said base only at said foil entrance end and is bendable in a plane parallel to said planar work surface to move toward and away from each other.

7. The apparatus of claim 2 wherein said base includes a pair of externally positioned oppositely disposed concave notches adjacent said foil exit end, and wherein each of said guide arms includes a concave notch aligned with one of the notches in said base to receive an operator's fingers for urging said arms toward each other.

8. The apparatus in claims 2 or 3 wherein said guide arms are molded integrally with each other and with a bridging member, said bridging member secured to said base and forming said attaching means.

* * * * *